United States Patent
Zuo et al.

(10) Patent No.: US 12,395,272 B2
(45) Date of Patent: Aug. 19, 2025

(54) METHOD FOR DETERMINING FREQUENCY-DOMAIN LOCATIONS, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhisong Zuo, Guangdong (CN); Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 265 days.

(21) Appl. No.: 18/147,706

(22) Filed: Dec. 29, 2022

(65) Prior Publication Data

US 2023/0216609 A1    Jul. 6, 2023

Related U.S. Application Data

(63) Continuation of application No. PCT/CN2020/119591, filed on Sep. 30, 2020.

(51) Int. Cl.
*H04L 1/08* (2006.01)
*H04L 5/00* (2006.01)

(52) U.S. Cl.
CPC .............. *H04L 1/08* (2013.01); *H04L 5/0012* (2013.01)

(58) Field of Classification Search
CPC .......... H04W 72/0446; H04W 72/0453; H04L 1/08; H04B 1/713
See application file for complete search history.

(56) References Cited

U.S. PATENT DOCUMENTS

| | | | |
|---|---|---|---|
| 12,010,705 B2 * | 6/2024 | Sengupta | H04L 1/04 |
| 2019/0020506 A1 * | 1/2019 | Cheng | H04L 5/0053 |
| 2019/0028143 A1 | 1/2019 | Zhang et al. | |
| 2022/0045806 A1 * | 2/2022 | Cirik | H04L 1/1887 |
| 2022/0210679 A1 * | 6/2022 | Cirik | H04W 72/0453 |
| 2022/0393823 A1 * | 12/2022 | Fan | H04L 1/1819 |
| 2024/0378402 A1 * | 11/2024 | Cui | H02J 50/001 |

FOREIGN PATENT DOCUMENTS

| | | |
|---|---|---|
| CN | 108631976 | 10/2018 |
| CN | 110365456 | 10/2019 |
| CN | 110830183 | 2/2020 |
| WO | 2016183739 | 11/2016 |

(Continued)

OTHER PUBLICATIONS

Mediatek Inc, "Enhancements of NR PUSCH for URLLC," 3GPP TSG RAN WG1 Meeting #95, R1-1812376, Nov. 2018.

(Continued)

*Primary Examiner* — Shukri Taha
(74) *Attorney, Agent, or Firm* — Hodgson Russ LLP

(57) ABSTRACT

The present disclosure discloses methods for determining frequency-domain locations, a terminal device, and a network device. The method includes the following. Determine one or more time-domain groups for transmitting repetition data, where each time-domain group includes one or more contiguous time-domain units. Determine a frequency-domain location corresponding to each time-domain group in the one or more time-domain groups.

8 Claims, 6 Drawing Sheets

(56) References Cited

FOREIGN PATENT DOCUMENTS

| WO | 2018161375 | 9/2018 | |
| WO | WO-2019031267 A1 * | 2/2019 | ........... H04B 1/7143 |
| WO | 2019136778 | 7/2019 | |
| WO | 2020024229 | 2/2020 | |
| WO | 2020145368 | 7/2020 | |

OTHER PUBLICATIONS

EPO, Extended European Search Report for EP Application No. 20955759.4, Oct. 17, 2023.

WIPO, International Search Report and Written Opinion for International Application No. PCT/CN2020/119591, Jul. 2, 2021.

"3rd Generation Partnership Project; Technical Specification Group Radio Access Network; NR; Physical layer procedures for data (Release 16)," 3GPP TS 38.214, Mar. 2020, v16.1.0.

China Telecom, "New SID on NR coverage enhancement," 3GPP TSG RAN Meeting #86, RP-193240, Dec. 2019.

"3rd Generation Partnership Project; Technical Specification Group Radio Access Network; NR; Radio Resource Control (RRC) protocol specification (Release 15)," 3GPP TS 38.331, Dec. 2019, v15.8.0.

EPO, Communication for EP Application No. 20955759.4, Mar. 20, 2025.

* cited by examiner

METHOD FOR DETERMINING FREQUENCY-DOMAIN LOCATIONS, TERMINAL DEVICE, AND NETWORK DEVICE

CROSS-REFERENCE TO RELATED APPLICATION(S)

This application is a continuation of International Application No. PCT/CN2020/119591, filed Sep. 30, 2020, the entire disclosure of which is hereby incorporated by reference.

TECHNICAL FIELD

This disclosure relates to the field of mobile communication, and in particular, to methods for determining frequency-domain locations, a terminal device, and a network device.

BACKGROUND

With rapid development of mobile communication technology and wide application of terminal devices, a frequency hopping technology can usually be used to determine a frequency-domain location corresponding to each slot in units of slots, thereby improving a frequency-domain gain.

For example, the terminal device determines a first frequency-domain location and a frequency-domain offset, and determines a second frequency-domain location according to the frequency domain offset. The first frequency-domain location and the second frequency-domain locations are alternatively determined by the terminal device as frequency-domain locations corresponding to multiple slots for data transmission. However, according to the above solution, corresponding frequency-domain locations can only be determined based on a single slot, and granularity of division of frequency-domain locations is small, resulting in a poor frequency-domain gain.

SUMMARY

Implementations of the present disclosure provide methods for determining frequency-domain locations, a terminal device, and a network device.

According to an aspect of the present disclosure, a method for determining frequency-domain locations is provided. The method is executed by a terminal device and includes the following. Determine one or more time-domain groups for transmitting repetition data, where each time-domain group includes one or more contiguous time-domain units. Determine a frequency-domain location corresponding to each time-domain group in the one or more time-domain groups.

According to another aspect of the present disclosure, a method for determining frequency-domain locations is provided. The method is executed by a network device and includes the following. Determine one or more time-domain groups for transmitting repetition data, where each time-domain group includes one or more contiguous time-domain units. Transmit scheduling information to a terminal device, where the scheduling information is used to instruct the terminal device to determine a frequency-domain location corresponding to each time-domain group in the one or more time-domain groups.

According to an aspect of the present disclosure, a terminal device is provided. The terminal device includes a processor and a memory storing a computer program which, when executed by the processor, causes the terminal device to determine one or more time-domain groups for transmitting repetition data, where each time-domain group includes one or more contiguous time-domain units; and determine a frequency-domain location corresponding to each time-domain group in the one or more time-domain groups.

According to an aspect of the present disclosure, a network device is provided. The network device includes a transceiver, a processor coupled with the transceiver, and a memory storing a computer program which, when executed by the processor, causes the network device to determine one or more time-domain groups for transmitting repetition data, where each time-domain group includes one or more contiguous time-domain units; and transmit scheduling information to a terminal device, where the scheduling information is used to instruct the terminal device to determine a frequency-domain location corresponding to each time-domain group in the one or more time-domain groups.

BRIEF DESCRIPTION OF THE DRAWINGS

To describe technical solutions in implementations of the present disclosure more clearly, the following will briefly introduce the accompanying drawings required for describing the implementations. Apparently, the accompanying drawings in the following description merely illustrate some implementations of the present disclosure. Those of ordinary skill in the art may also obtain other accompanying drawings based on these accompanying drawings without creative efforts.

DETAILED DESCRIPTION

In order to make the purpose, technical solutions, and advantages of the present disclosure clearer, implementations of the present disclosure will be further described in detail below in conjunction with the accompanying drawings.

It can be understood that the terms "first", "second" and the like used in the present disclosure may be used to describe various concepts herein, but unless otherwise specified, these concepts are not limited by these terms. These terms are only used to distinguish one concept from another.

For the term "each", "multiple", "at least one", "any", etc. used in the present disclosure, "at least one" includes one, two, or more than two, "multiple" includes two or more than two, "each" refers to each of corresponding multiple, and "any" refers to any one of multiple. For example, multiple elements include three elements, "each" refers to each of the three elements, and "any" refers to any one of the three elements, which may be the first element, the second element, or the third element. First, the terms involved in the implementations of the present disclosure will be briefly illustrated.

Data channel aggregation: in new radio (NR) technology, a terminal device can determine number of repetitions for data (i.e., aggregation factor) according to uplink transmission and downlink transmission, aggregates multiple slots according to the aggregation factor, and performs physical uplink shared channel (PUSCH) and physical downlink shared channel (PDSCH) data transmission based on multiple slots aggregated, where by means of multiple slots-based transmission, a range covered by each transmission can be expanded.

Figure 1:
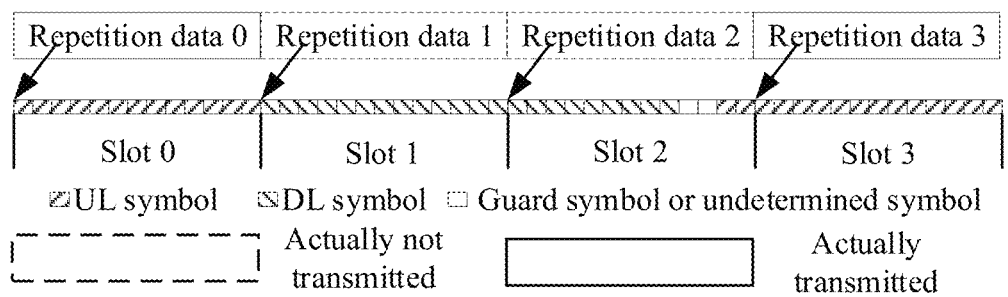
FIG. 1 is a schematic diagram illustrating repetition-data transmission provided in an exemplary implementation of the present disclosure.

In addition, in case of multiple slots-based data transmission, symbols that can be used for data transmission are first determined. If a symbol does not satisfy transmission requirements, the symbol is ignored. For example, as illustrated in FIG. 1, uplink (UL) symbols and downlink (DL) symbols are illustrated, repetition data 0 and repetition data 3 are actually transmitted, and repetition data 1 and repetition data 2 are not transmitted.

Frequency hopping technology: frequency hopping technology refers to that in a preset frequency range, different frequency-domain locations are selected for data transmission according to a preset rule, which can improve a frequency-domain gain. In addition, data transmission is required to be performed in an operating bandwidth of the terminal device.

Figure 2:
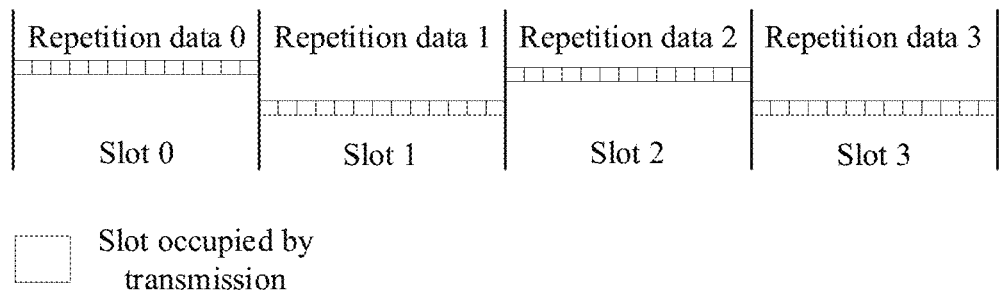
FIG. 2 is a schematic diagram illustrating a correspondence between slots and frequency-domain locations provided in an exemplary implementation of the present disclosure.

For example, FIG. 2 is a schematic diagram illustrating frequency-domain locations in units of slots in case of transmission of repetition data. Four slots, which are respectively slot 0, slot 1, slot 2, and slot 3, are illustrated in FIG. 2. Repetition data 0 is transmitted in slot 0, repetition data 1 is transmitted in slot 1, repetition data 2 is transmitted in slot 2, and repetition data 3 is transmitted in slot 3, where slot 0 and slot 2 correspond to a same frequency-domain location, and slot 1 and slot 3 correspond to a same frequency-domain location.

Figure 3:
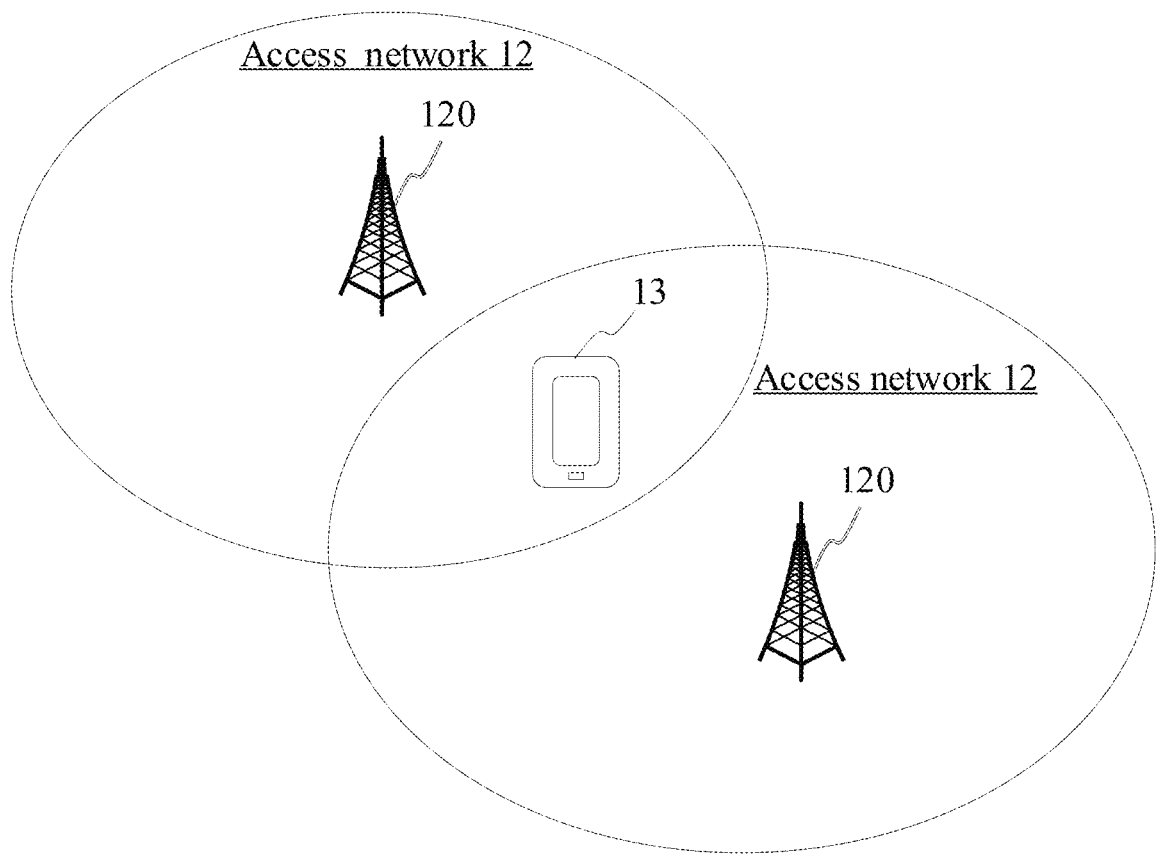
FIG. 3 is a block diagram of a communication system provided in an exemplary implementation of the present disclosure.

FIG. 3 is a block diagram illustrating a communication system provided in an exemplary implementation of the present disclosure. The communication system may include an access network 12 and a terminal device 13.

In the access network 12 several network devices 120 are included. The network device 120 may be a base station, and the base station is a device deployed in the access network to provide wireless communication functions for terminal devices. The base station may include various forms of macro base stations, micro base stations, relay stations, access points and so on. In systems using different wireless access technologies, names of devices with base-station functions may be different. For example, in a long term evolution (LTE) system, the base station is called an evolutional node B (eNodeB or eNB), and in the fifth generation new radio in unlicensed spectrum (5G NR-U) system, the base station is called a generation node B (gNodeB or gNB). As communication technology evolves, the illustration of the "base station" may change. In implementations of the present disclosure, for convenience, the above-mentioned devices that provide wireless communication functions for the terminal device 13 are collectively referred to as network devices.

The terminal device 13 may include various devices with wireless communication functions such as handheld devices, vehicle-mounted devices, wearable devices, and computing devices, or other processing devices connected to wireless modems, as well as various forms of user equipment, mobile stations (MSs), terminal devices and so on. For easy illustration, the devices mentioned above are collectively referred to as terminal devices. The network device 120 and the terminal device 13 communicate with each other through a certain air-interface technology, such as a Uu interface.

The technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS) system, an LTE system, an LTE frequency division duplex (FDD) system, an LTE time division duplex (TDD) system, an advance LTE (LTE-A) system, an NR system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) system, a wireless local area network (WLAN), a wireless fidelity (Wi-Fi), a next generation system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), vehicle to vehicle (V2V) communication, and vehicle to everything (V2X) system. The implementations of the present disclosure can also be applicable to these communication systems.

Figure 4:
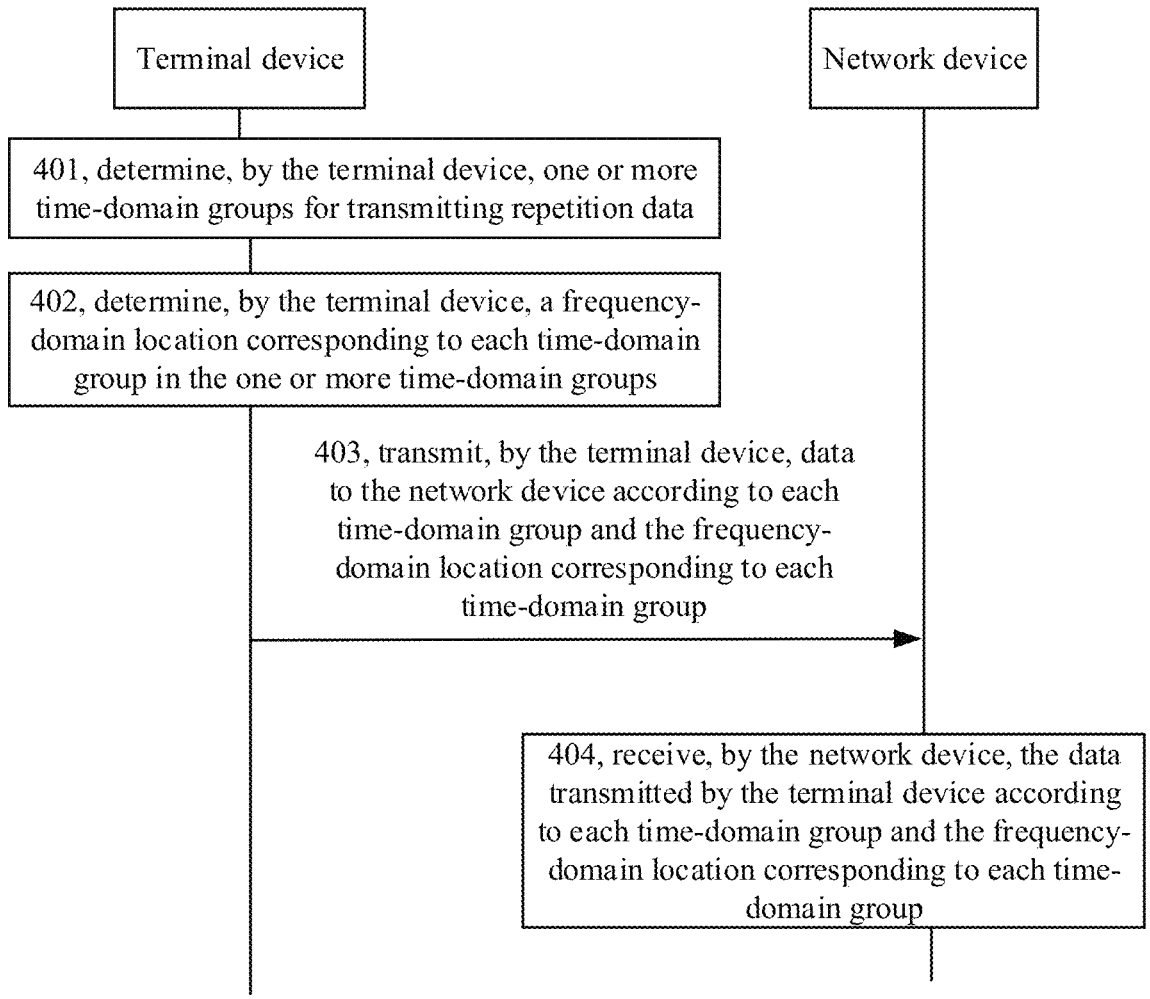
FIG. 4 is a flow chart of a method for determining frequency-domain locations provided in an exemplary implementation of the present disclosure.

FIG. 4 is a flow chart of a method for determining frequency-domain locations provided in an exemplary implementation of the present disclosure. The method is applied to the terminal device illustrated in FIG. 3 and includes the following.

At 401, the terminal device determines one or more time-domain groups for transmitting repetition data.

In implementations of the present disclosure, in order to transmit repetition data by using frequency hopping technology, the terminal device can determine a time-domain group that includes one or more contiguous time-domain units, then can determine a frequency-domain location corresponding to each time-domain group. One or more time-domain units in each time-domain group correspond to a same frequency-domain location, that is, frequency hopping does not occur for time-domain units in a same time-domain group. Different time-domain groups may correspond to a same frequency-domain location or different frequency-domain locations. Therefore, before determining frequency-domain locations, first determine one or more time-domain groups.

Each time-domain group includes one or more contiguous time-domain units, that is, in implementations of the present disclosure, time-domain units are grouped into time-domain groups each including one or more time-domain units. For example, each time-domain group includes 3 or 5 contiguous time-domain units, or other numbers of contiguous time-domain units.

In some implementations, in the one or more time-domain groups determined, frequency-domain locations corresponding to at least two time-domain groups are not contiguous.

In the above case, multiple time-domain groups are determined, and in the multiple time-domain groups, frequency-domain locations corresponding to at least two time-domain groups are not contiguous.

For example, the terminal device determines time-domain group 1, time-domain group 2, and time-domain group 3, where time-domain group 1 corresponds to frequency-domain location 1, time-domain group 2 corresponds to frequency-domain location 2, and time-domain group 3 corresponds to frequency-domain location 3.

In some implementations, the terminal device determines more than 3 frequency-domain locations.

In some implementations, the time-domain unit is a symbol or a symbol set.

Alternatively, the time-domain unit is a slot.

For example, the time-domain unit is a symbol set. Each symbol set includes preset number of symbols, where the preset number may be 2, 3, 4, or other numeral values.

The preset number is set by the terminal device, or set by the network device, or set in other manners.

In some implementations, before determining the one or more time-domain groups for transmitting repetition data, the method further includes the following. Obtain information of one or more frequency-domain locations, and determine the one or more time-domain groups according to the information of the one or more frequency-domain locations.

In a possible implementation, the one or more time-domain groups are in one-to-one correspondence with the one or more frequency-domain locations. That is, one time-domain group corresponds to one frequency-domain location.

In another possible implementation, the number of time-domain units in each time-domain group in the one or more time-domain groups can be determined according to at least one of an aggregation factor or information of one or more frequency-hopping locations.

Determining the one or more time-domain groups according to at least one of the aggregation factor or the information of the one or more frequency-hopping locations includes the following three cases: determine the one or more time-domain groups according to the aggregation factor, determine the one or more time-domain groups according to the number of the frequency-hopping locations, and determine the one or more time-domain groups according to the aggregation factor and the information of the one or more frequency-hopping locations. The following will illustrate the manner of determining the one or more time-domain groups in each of the three cases.

Case 1: determine the number of the time-domain units in each time-domain group in the at least one time-domain group according to the aggregation factor.

The aggregation factor indicates the number of time-domain units. The aggregation factor is set by the network device, set by an operator, or set in other manners. For example, the aggregation factor may be 2, 4, 8, or other numeral values. If the aggregation factor is 4, it indicates that the number of the time-domain units is 4, and if the aggregation factor is 8, it indicates that the number of the time-domain units is 8.

For another example, if the time-domain unit is a slot, the aggregation factor indicates the number of slots, or if the time-domain unit is a symbol, the aggregation factor indicates the number of symbols.

After the aggregation factor is obtained, time-domain units used can be determined. In this case, the one or more time-domain groups can be determined according to the time-domain units determined, where each determined time-domain group includes one or multiple contiguous time-domain units.

In some implementations, the number of the time-domain units in each time-domain group in the one or more time-domain groups can be determined according to the aggregation factor and the number of the one or more time-domain groups.

The number of the one or more time-domain groups is set by the network device, set by the operator, or set in other manners. The number of the one or more time-domain groups may be 3, 4, 5 or other numerical values.

For example, by determining a ratio of the aggregation factor to the number of the one or more time-domain groups, the number of the time-domain units in each time-domain group can be determined, then the one or more time-domain groups can be determined.

For example, if the aggregation factor is 4 and the number of the one or more time-domain groups is 4, then 4 time-domain groups can be determined, where each time-domain group includes one time-domain unit.

Case 2: determine the number of the time-domain units in each time-domain group in the one or more time-domain groups according to information of one or more frequency-domain locations.

In some implementations, the information of the one or more frequency-domain locations includes the number of the one or more frequency-domain locations.

The terminal device groups time-domain units according to the number of the one or more frequency-domain locations, so as to determine the number of the time-domain units in each time-domain group.

In a possible implementation manner, the number of the one or more frequency-domain locations is equal to the number of the frequency-hopping locations.

Determine the number of the time-domain units in each time-domain group in the one or more time-domain groups by grouping at least one time-domain unit according to the number of the frequency-hopping locations.

The terminal device can group the at least one time-domain unit according to the number of the frequency-hopping locations, where the number of the one or more time-domain groups obtained by grouping is equal to the number of the frequency-hopping locations.

For example, if the number of the frequency-hopping locations is 3 and the number of time-domain units is 6, the time-domain units are grouped into 3 time-domain groups, where each time-domain group includes 2 time-domain units. Alternatively, if the number of the frequency-hopping locations is 2 and the number of time-domain units is 6, the time-domain units are grouped into 2 time-domain groups, where each time-domain group includes 3 time-domain units.

Case 3: determine the number of the time-domain units in each time-domain group in the one or more time-domain groups according to the aggregation factor and the number of the frequency-hopping locations.

In some implementations, the number of the time-domain units in each time-domain group is determined according to the ratio of the aggregation factor to the number of the frequency-hopping locations. Specifically, any one of the following manners is included.

1. If the largest integer not greater than the ratio of the aggregation factor to the number of the frequency-hopping locations is 0, it is determined that each time-domain group includes one time-domain unit.

In implementations of the present disclosure, the ratio of the aggregation factor to the number of the frequency-hopping locations can be determined first, and the largest integer not greater than the ratio is determined according to the ratio. If the largest integer is 0, at least one time-domain unit is determined as one time-domain group.

For example, if the aggregation factor is 3 and the number of the frequency-hopping locations is 4, then it is determined that the ratio of the aggregation factor to the number of the frequency-hopping locations is 0.75, and the largest integer not greater than 0.75 is 0. In this case, it is determined that each time-domain group includes one time-domain unit.

2. If the maximum integer not greater than the ratio of the aggregation factor to the number of the frequency-hopping locations is greater than 0, the maximum integer is determined as the number of the time-domain units in each time-domain group.

In implementations of the present disclosure, the ratio of the aggregation factor to the number of the frequency-hopping locations can be determined first, and the largest integer not greater than the ratio can be determined according to the ratio. If the largest integer is greater than 0, it means that time-domain units can be grouped, and the maximum integer is determined as the number of the time-domain units in each time-domain group.

For example, if the aggregation factor is 8 and the number of the frequency-hopping locations is 4, it is determined that the ratio of the aggregation factor to the number of the frequency-hopping locations is 2, and the largest integer not greater than 2 is 2. In this case, it is determined that each time-domain group includes 2 time-domain units.

In some implementations, at least one time-domain group is determined by using the following formulation.

$$T_{slot} = \begin{cases} \lfloor T_{Repetition}/N_{FH} \rfloor & \text{if } \lfloor T_{Repetition}/N_{FH} \rfloor > 0 \\ 1 & \text{if } \lfloor T_{Repetition}/N_{FH} \rfloor = 0 \end{cases}$$

$T_{slot}$ represents the number of the time-domain units in each time-domain group, $N_{FH}$ represents the number of the frequency-hopping locations, $T_{Repetition}$ represents the aggregation factor, and $\lfloor T_{Repetition}/N_{FH} \rfloor$ represents the largest integer not greater than the ratio of the aggregation factor to the number of the frequency-hopping locations.

In other implementations, the number of the time-domain units in each time-domain group is determined according to a comparison between the aggregation factor and the number of the frequency-hopping locations. Specifically, any one of the following manners is included.

1. If the aggregation factor is less than the number of the frequency-hopping locations, it is determined that each time-domain group includes one time-domain unit.

2. If the aggregation factor is not less than the number of the frequency-hopping locations, the largest integer not greater than the ratio of the aggregation factor to the number of the frequency-hopping locations is determined as the number of the time-domain units in each time-domain group.

In other implementations, the number of the time-domain units in each time-domain group is determined according to whether the ratio of the aggregation factor to the number of the frequency-hopping locations is greater than 1. Specifically, any one of the following manners is included.

1. If the ratio of the aggregation factor to the number of the frequency-hopping locations is less than 1, it is determined that each time-domain group includes one time-domain unit.

2. If the ratio of the aggregation factor to the number of the frequency-hopping locations is not less than 1, the largest integer not greater than the ratio of the aggregation factor to the number of the frequency-hopping locations is determined as the number of the time-domain units in each time-domain group.

In addition, the number of the one or more frequency-domain locations involved in implementations of the present disclosure is determined according to the number of one or more frequency-domain offsets, or set through higher-layer signaling.

In some implementations, the number of the one or more frequency-domain locations is a sum of the number of the one or more frequency-domain offsets and 1.

For example, if the number of the frequency-domain offsets determined by the terminal device is 3, it is determined that the number of the frequency-hopping locations is 4. If the number of the frequency-domain offsets determined by the terminal device is 5, it is determined that the number of the frequency-hopping locations is 6.

In addition, in other implementations, if the terminal device determines multiple time-domain units, the terminal device groups the multiple time-domain units into multiple time-domain groups. During grouping, according to the time order of the time-domain units, the terminal device sequentially groups the time-domain units into the multiple time-domain groups, where each time-domain group includes multiple contiguous time-domain units.

It is to be noted that in implementations of present disclosure, determination of the number of the time-domain units in each time-domain group is merely taken as an example for illustration. In another implementation, the terminal device can also group at least one time-domain unit into the first number of time-domain groups according to the determined first number.

In some implementations, the terminal device randomly groups the at least one time-domain unit into the first number of time-domain groups according to the first number.

For example, if the number of time-domain units is 4, namely time-domain unit 1, time-domain unit 2, time-domain unit 3, and time-domain unit 4, and the determined first number of time-domain groups is 2, then time-domain unit 1 can form a time-domain group, and time-domain unit 2, time-domain unit 3, and time-domain unit 4 can be grouped into a time-domain group; or time-domain unit 1 and time-domain unit 2 can be grouped into a time-domain group, and time-domain unit 3 and time-domain unit 4 can be grouped into a time-domain group; or time-domain unit 1, time-domain unit 2, and time-domain unit 3 can be grouped into a time-domain group, and time-domain unit 4 can form a time-domain group.

At 402, the terminal device determines a frequency-domain location corresponding to each time-domain group in the one or more time-domain groups.

In implementations of the present disclosure, after the one or more time-domain groups are obtained by grouping time-domain units, the frequency-domain location corresponding to each time-domain group can be determined, then a frequency-domain location corresponding to one or more time-domain units in each time-domain group can also be determined, and then in case of performing frequency hopping to transmit repetition data, data transmission can be performed according to the determined frequency-domain location corresponding to each time-domain group.

In some implementations, determine the frequency-domain location corresponding to each time-domain group as follows. Determine the frequency-domain location corresponding to each time-domain group according to a frequency-domain offset corresponding to each time-domain group in one or more frequency-domain offsets, by taking a frequency-domain location corresponding to a first time-domain group in the one or more time-domain groups as a reference.

The frequency-domain location corresponding to the first time-domain group is configured by the network device. A frequency-domain offset indicates an offset between a frequency-domain location corresponding to a time-domain group corresponding to the frequency-domain offset and the frequency-domain location corresponding to the first time-domain group.

After the frequency-domain offset corresponding to each time-domain group is determined, the frequency-domain location corresponding to each time-domain group can be determined according to each determined frequency-domain offset and the frequency-domain location corresponding to the first time-domain group.

For example, the frequency-domain offsets are respectively frequency-domain offset 1, frequency-domain offset 2, and frequency-domain offset 3, and one or more determined time-domain groups are respectively time-domain group 1, time-domain group 2, and time-domain group 3, where time-domain group 1 corresponds to frequency-domain offset 1, time-domain group 2 corresponds to frequency-domain offset 2, and time-domain group 3 corresponds to frequency-domain offset 3.

In some implementations, a target time-domain group to which a time-domain unit belongs is determined according to an identifier of the time-domain unit, a frequency-domain offset corresponding to the target time-domain group is determined according to the target time-domain group, and a frequency-domain location corresponding to the target-domain group is determined according to the frequency-domain location corresponding to the first time-domain group and the frequency-domain offset corresponding to the target time-domain group.

After one or more time-domain groups are determined, each time-domain unit belongs to a time-domain group. For each time-domain unit, the target time-domain group to which the time-domain unit belongs is determined, then the frequency-domain offset corresponding to the target time-domain group is determined, and the frequency-domain location corresponding to the first time-domain group is offset the frequency-domain offset corresponding to the target time-domain group to determine the frequency-domain location corresponding to the target time-domain group. Accordingly, a frequency-domain location corresponding to each time-domain unit in each time-domain group is determined according to the determined frequency-domain location corresponding to each time-domain group.

According to the identifier of a time-domain unit, determine the target time-domain group to which the time-domain unit belongs as follows. Determine the identifier of the time-domain unit, determine a ratio of the determined identifier of the time-domain unit and the number of time-domain units in a time-domain group, and determine the largest integer not greater than the ratio as the identifier of the time-domain group to which the time-domain unit belongs.

For example, if the determined identifier of a time-domain group is 1, the first frequency-domain offset is determined as a frequency-domain offset corresponding to time-domain group 1, and if the determined identifier of a time-domain group is 2, the second frequency-domain offset is determined as a frequency-domain offset corresponding to time-domain group 2.

The identifier of a time-domain unit is 0, 1, 2 or other numerical values. The manner of determining the largest integer not greater than the ratio is similar to the above-mentioned manner of determining the largest integer not greater than the ratio, which will not be repeated herein.

In addition, in implementations of the present disclosure, with the following formula, the target time-domain group to which a time-domain unit belongs can be determined according to the identifier of the time-domain unit.

$$i = \lfloor n/T_{slot} \rfloor$$

i is the identifier of a time-domain group to which a time-domain unit belongs, n is the identifier of the time-domain unit, $T_{slot}$ is the number of time-domain units in the time-domain group, $\lfloor n/T_{slot} \rfloor$ is the largest integer not greater than a first ratio, and the first ratio is a ratio of the identifier of the time-domain unit to the number of time-domain units in the time-domain group to which the time-domain unit belongs.

In addition, it is to be noted that n in the above formula is a numeral value starting from 0. For example, n is 0, 1, 2 or other numerical values.

In some other implementations, the target time-domain group to which a time-domain unit belongs is determined according to the identifier of the time-domain unit, and the frequency-domain offset corresponding to the target time-domain group is determined according to the target time-domain group, and the frequency-domain location corresponding to the target time-domain group is determined according to the frequency-domain location corresponding to the first time-domain group, the frequency-domain offset corresponding to the first time-domain group, and the current operating bandwidth.

If the target time-domain group to which a time-domain unit belongs is determined, the frequency-domain location corresponding to the target time-domain group can be determined according to the frequency-domain offset corresponding to the target time-domain group and the frequency-domain location corresponding to the first time-domain group. In this case, the determined frequency-domain location corresponding to the target time-domain group may locate outside the current operating bandwidth. To ensure that the determined frequency-domain location corresponding to the determined target time-domain group is within the current operating bandwidth, the remainder of the frequency-domain location corresponding to the target time-domain group divided by the current operating bandwidth is obtained, and the remainder obtained is determined as the frequency-domain location corresponding to the target time-domain group. In this case, it can be ensured that the frequency-domain location determined is within the current operating bandwidth.

In other implementations, the following formula is used to determine the frequency-domain location corresponding to each time-domain group:

$$RB^i_{offset} = \begin{cases} FH(i \bmod N_{FH}) \, i > 0 \\ 0 \, i = 0 \end{cases}$$

$$RB^i = (RB_{start} + RB^i_{offset}) \bmod N^{size}_{BWP}$$

i represents the identifier of a time-domain group, $N_{FH}$ represents the number of the frequency-hopping locations, $RB_{start}$ represents the frequency-domain location corresponding to the first time-domain group, i mod $N_{FH}$ represents the remainder of i divided $N_{FH}$, FH (i mod $N_{FH}$) represents a frequency-hopping formula, $N_{BWP}^{size}$ represents the current operating bandwidth, $RB^i_{offset}$ represents a frequency-domain offset corresponding to the i-th time-domain group, $(RB_{start}+RB^i_{offset})$mod $N_{BWP}^{size}$ represents the remainder of the ratio of the frequency-domain location corresponding to the first time-domain group to the frequency-domain offset corresponding to the i-th time-domain group divided by the current operating bandwidth, and $RB^i$ represents the frequency-domain location corresponding to the i-th time-domain group.

A frequency-domain location corresponding to a time-domain group is a resource block (RB) location. The current operating bandwidth is a bandwidth part (BWP).

Figure 5:
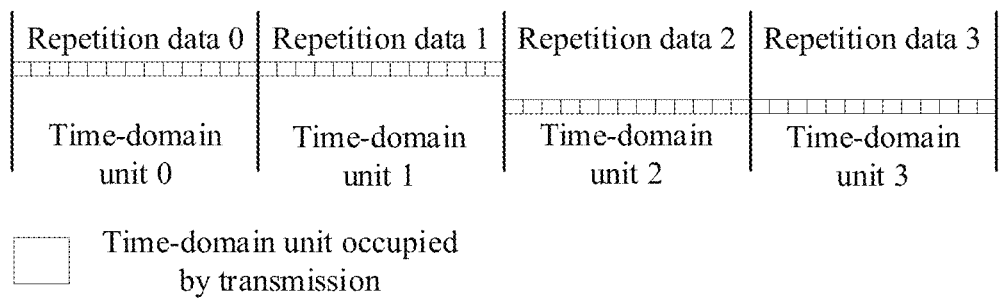
FIG. 5 is a schematic diagram illustrating a correspondence between time-domain units and frequency-domain locations provided in an exemplary implementation of the present disclosure.

In implementations of the present disclosure, in the case where the frequency-domain location corresponding to each time-domain unit is determined according to the aggregation factor and the number of the frequency-hopping locations, if the aggregation factor is 4 and the number of the frequency-hopping locations is 2, as illustrated in FIG. 5, two time-domain groups can be determined, where each time-domain group includes two time-domain units, and each time-domain group corresponds to one frequency-domain location.

Figure 6:
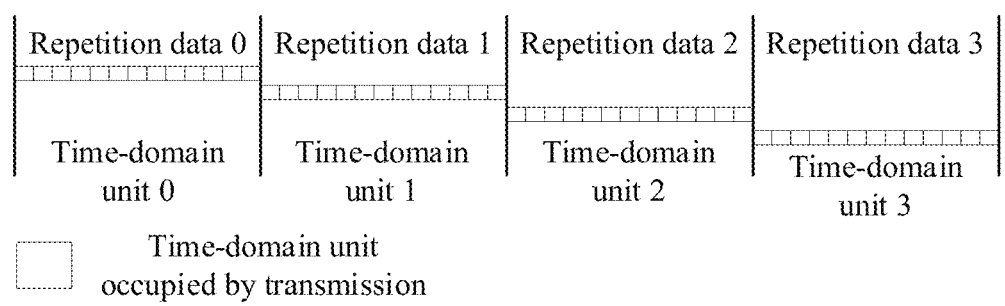
FIG. 6 is a schematic diagram illustrating a correspondence between time-domain units and frequency-domain locations provided in an exemplary implementation of the present disclosure.

For another example, if the aggregation factor is 4 and the number of the frequency hopping locations is 4, as illustrated in FIG. 6, 4 time-domain groups can be determined, where each time-domain group includes one time-domain unit, and each time-domain group corresponds to one frequency-domain location.

It is to be noted that in implementations of the present disclosure, at least one frequency-domain offset is taken as an example for illustration. In another implementation, at least one frequency-domain offset is stored in a frequency-domain offset list, and frequency-domain offsets are in correspondence with labels. For example, frequency-domain offset 1 corresponds to label 1, and frequency-domain offset 2 corresponds to label 2.

The terminal device can determine the frequency-domain offset corresponding to each time-domain group from the frequency-domain offset list, and then determine the frequency-domain location corresponding to each time-domain group according to the frequency-domain offset determined.

At 403, the terminal device transmits data to the network device according to each time-domain group and the frequency-domain location corresponding to each time-domain group.

At 404, the network device receives the data transmitted by the terminal device according to each time-domain group and the frequency-domain location corresponding to each time-domain group.

In implementations of the present disclosure, after the terminal device determines the frequency-domain location corresponding to each time-domain group, the terminal device can determine the frequency-domain location corresponding to one or more time-domain units in each time-domain group, and then transmit data to the network device on the frequency-domain location corresponding to each time-domain unit, and the network device can receive the data transmitted by the terminal device on the corresponding frequency-domain location.

In addition, the method provided by implementations of the present disclosure can be applied to the scenario where frequency-domain locations for frequency hopping in the frequency-hopping technology are determined, where frequency-hopping transmission is performed on the determined frequency-domain location corresponding to each time-domain unit. In addition, the method provided by implementations of the present disclosure can also be applied to the scenario where resource locations are measured, where a frequency-domain location corresponding to a time-domain unit to be detected can be determined.

It is to be noted that in implementations of the present disclosure, the terminal device directly determining time-domain groups and the frequency-domain location corresponding to each time-domain group is merely taken as an example for illustration. In another implementation, before the operation at 401, the method further includes operations at 411-412:

At 411, the network device transmits scheduling information to the terminal device.

At 412, the terminal device receives the scheduling information transmitted by the network device.

The scheduling information includes at least one of the aggregation factor or the information of the frequency-domain locations.

In some implementations, the information of the frequency-domain locations includes the number of the frequency-domain locations.

In addition, in implementations of the present disclosure, in the process of determining the one or more time-domain groups, receiving the scheduling information once by the terminal device is called a scheduling, and one or more time-domain groups are determined according to time-domain units scheduled in this scheduling, and the frequency-domain location corresponding to each time-domain unit in this scheduling can be determined.

In addition, the time-domain units involved in implementations of the present disclosure is time-domain units scheduled with grant or without grant. The terminal device can receive pre-configured periodic scheduling information, and each time a period arrives, it can be understood as a scheduling.

Implementations of the present disclosure provide the method for determining frequency-domain locations based on time-domain groups, which can group time-domain units, in units of time-domain units, into one or more time-domain groups, where each time-domain group includes one or more time-domain units, and then frequency-domain locations are determined according to the time-domain groups, which can overcome the limitation that frequency-domain locations can only be determined based on a single slot, and can improve granularity of division of frequency-domain locations, thereby improving frequency-domain gain effect.

Moreover, multiple frequency-domain locations can be determined according to the aggregation factor and information of one or more frequency-domain locations, which can overcome the limitation of determining frequency-domain locations corresponding to slots by only using two frequency-domain locations alternatively, thereby ensuring data transmission on different frequency-domain locations and improving frequency-domain gain effect.

In addition, the determined time-domain group may include multiple time-domain units, and the multiple time-domain units correspond to a same frequency-domain location, so that joint channel estimation can be performed on the multiple time-domain units based on a demodulation reference signal, which can improve data transmission and a channel estimation gain.

Figure 7:
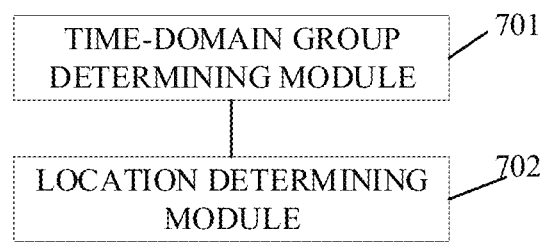
FIG. 7 is a block diagram of an apparatus for determining frequency-domain locations provided in an exemplary implementation of the present disclosure.

FIG. 7 is a block diagram illustrating an apparatus for determining frequency-domain locations provided in an exemplary implementation of the present disclosure. The apparatus includes a time-domain group determining module 701, and a location determining module 702. The time-domain group determining module 701 is configured to determine one or more time-domain groups for transmitting repetition data, where each time-domain group includes one or more contiguous time-domain units. The location determining module 702 is configured to determine a frequency-domain location corresponding to each time-domain group in the one or more time-domain groups.

The apparatus provided in implementations of the present disclosure can group time-domain units, in units of time-domain units, into one or more time-domain groups, where each time-domain group includes one or more time-domain units, and then frequency-domain locations are determined according to the time-domain groups, which can overcome the limitation that frequency-domain locations can only be determined based on a single slot, and can improve granularity of division of frequency-domain locations, thereby improving frequency-domain gain effect.

In some implementations, frequency-domain locations corresponding to at least two time-domain groups in the one or more time-domain groups are not contiguous.

In some implementations, the number of frequency-domain locations determined is greater than 3.

Figure 8:
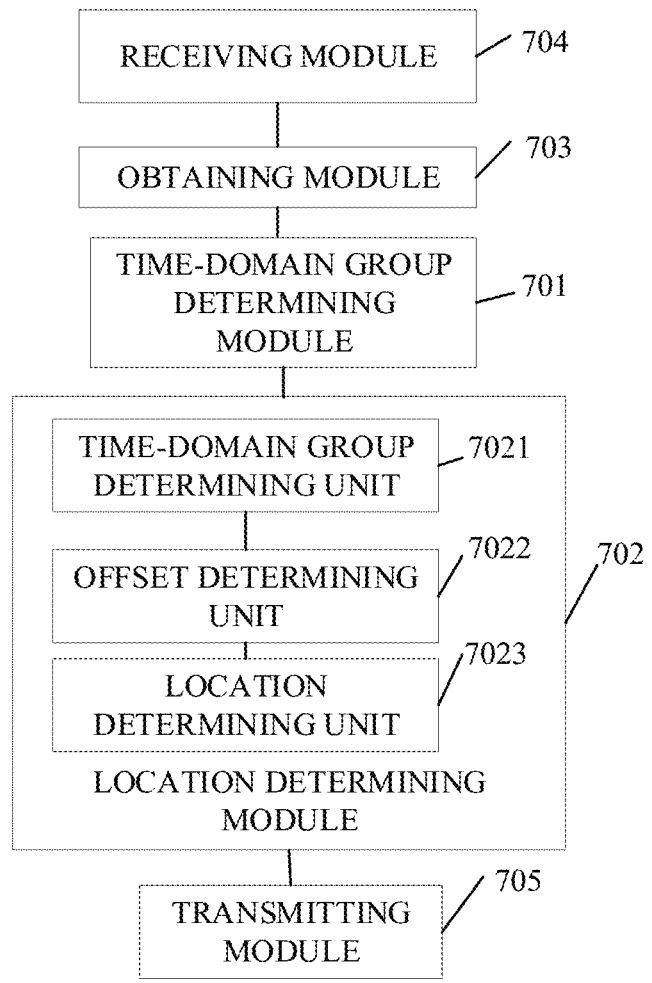
FIG. 8 is a block diagram of an apparatus for determining frequency-domain locations provided in an exemplary implementation of the present disclosure.

In some implementations, referring to FIG. 8, the apparatus further includes an obtaining module 703 configured to obtain information of one or more frequency-domain locations. The time-domain group determining module 701 is configured to determine the one or more time-domain groups according to the information of the one or more frequency-domain locations.

In some implementations, the one or more time-domain groups are in one-to-one correspondence with the one or more frequency-domain locations.

In some implementations, the number of the time-domain units in each time-domain group in the one or more time-domain groups is determined according to at least one of an aggregation factor or the information of the one or more frequency-domain locations, where the aggregation factor indicates the number of time-domain units.

In some implementations, the number of the time-domain units in each time-domain group in the one or more time-domain groups is determined according to the aggregation factor and the number of the one or more time-domain groups.

In some implementations, the information of the one or more frequency-domain locations includes the number of the one or more frequency-domain locations.

In some implementations, the number of the one or more frequency-domain locations is equal to the number of frequency-hopping locations.

In some implementations, the time-domain group determining module 701 is configured to determine the number of the time-domain units in each time-domain group in the one or more time-domain groups by grouping at least one time-domain unit according to the number of the frequency-hopping locations.

In some implementations, the number of the time-domain units in each time-domain group in the one or more time-domain groups is determined according to the aggregation factor and the number of the frequency-hopping locations.

In some implementations, the time-domain units in each time-domain group is determined according to a ratio of the aggregation factor to the number of the frequency-hopping locations. Each time-domain group is determined to include one time-domain unit on condition that the largest integer not greater than the ratio of the aggregation factor to the number of the frequency-hopping locations is 0. Alternatively, the largest integer is determined as the number of the time-domain units in each time-domain group on condition that the largest integer not greater than the ratio of the aggregation factor to the number of the frequency-hopping locations is larger than 0.

In some implementations, the at least one time-domain group is determined with the following formula:

$$T_{slot} = \begin{cases} \lfloor T_{Repetition} / N_{FH} \rfloor & \text{if } \lfloor T_{Repetition} / N_{FH} \rfloor > 0 \\ 1 & \text{if } \lfloor T_{Repetition} / N_{FH} \rfloor = 0 \end{cases}$$

$T_{slot}$ represents the number of the time-domain units in each time-domain group, $N_{FH}$ represents the number of the frequency-hopping locations, $T_{Repetition}$ represents the aggregation factor, and $\lfloor T_{Repetition} / N_{FH} \rfloor$ represents the largest integer not greater than the ratio of the aggregation factor to the number of the frequency-hopping locations.

In some implementations, the number of the one or more frequency-domain locations is determined according to the number of one or more frequency-domain offsets, or set by higher-layer signaling.

In some implementations, the number of the one or more frequency-domain locations is a sum of the number of the one or more frequency-domain offsets and 1.

In some implementations, the location determining module 702 is configured to determine the frequency-domain location corresponding to each time-domain group according to a frequency-domain offset corresponding to each time-domain group in the one or more frequency-domain offsets, by taking a frequency-domain location corresponding to a first time-domain group in the one or more time-domain groups as a reference, where each frequency-domain offset indicates an offset between a frequency-domain location corresponding to a time-domain group corresponding to the frequency-domain offset and the frequency-domain location corresponding to the first time-domain group.

In some implementations, referring to FIG. 8, the location determining module 702 includes a time-domain group determining unit 7021, an offset determining unit 7022, and a location determining unit 7023. The time-domain group determining unit 7021 is configured to determine, according to an identifier of a time-domain unit, a target time-domain group to which the time-domain unit belongs. The offset determining unit 7022 is configured to determine a frequency-domain offset corresponding to the target time-domain group according to the target time-domain group. The location determining unit 7023 is configured to determine a frequency-domain location corresponding to the target time-domain group according to the frequency-domain location corresponding to the first time-domain group and the frequency-domain offset.

In some implementations, the target time-domain group to which the time-domain unit belongs is determined according to the identifier of the time-domain unit by using the following formula: $i = \lfloor n/T_{slot} \rfloor$, where i represents the identifier of the time-domain group to which the time-domain unit belongs, n represents the identifier of the time-domain unit, $T_{slot}$ represents the number of time-domain units in the time-domain group, $\lfloor n/T_{slot} \rfloor$ represents the largest integer not greater than a first ratio, where the first ratio is a ratio of the identifier of the time-domain unit to the number of the time-domain units in the time-domain group to which the time-domain unit belongs.

In some implementations, the frequency-domain location corresponding to each time-domain group in the one or more time-domain groups is determined by using the following formula:

$$RB^i_{offset} = \begin{cases} FH(i \bmod N_{FH}) & i > 0 \\ 0 & i = 0 \end{cases}$$

$$RB^i = (RB_{start} + RB^i_{offset}) \bmod N^{size}_{BWP}$$

i represents the identifier of a time-domain group, $N_{FH}$ represents the number of the frequency-hopping locations, $RB_{start}$ represents a frequency-domain location corresponding to a first time-domain group, $i \bmod N_{FH}$ represents a remainder of i divided by $N_{FH}$, $FH(i \bmod N_{FH})$ represents a frequency-hopping formula, $N_{BWP}^{size}$ represents the current operating bandwidth, $RB^i_{offset}$ represents the frequency-domain offset corresponding to the i-th time-domain group, $(RB_{start}+RB^i_{offset}) \bmod N_{BWP}^{size}$ represents a remainder of the ratio of the frequency-domain location corresponding to the first time-domain group to the frequency-domain offset corresponding to the i-th time-domain group divided by the current operating bandwidth, and $RB^i$ represents a frequency-domain location corresponding to the i-th time-domain group.

In some implementations, the frequency-domain location corresponding to the first time-domain group is set by a network device.

In some implementations, referring to FIG. 8, the apparatus further includes a receiving module 704 configured to receive scheduling information transmitted by the network device, where the scheduling information includes at least one of the aggregation factor or the information of the frequency-domain locations.

In some implementations, referring to FIG. 8, the apparatus further includes a transmitting module 705 configured to transmit data to the network device according to each time-domain group and the frequency-domain location corresponding to each time-domain group.

In some implementations, each time-domain unit is a symbol, a symbol set, or a slot.

Figure 9:
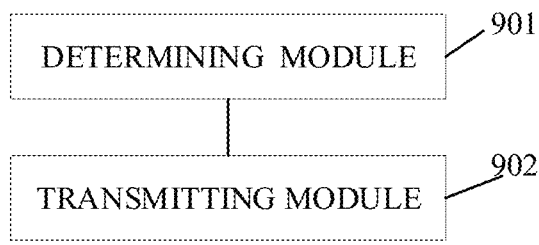
FIG. 9 is a block diagram of an apparatus for determining frequency-domain locations provided in an exemplary implementation of the present disclosure.

FIG. 9 is a block diagram illustrating an apparatus for determining frequency-domain locations provided in an exemplary implementation of the present disclosure. The apparatus includes a determining module 901 and a transmitting module 902. The determining module 901 is configured to determine one or more time-domain groups for transmitting repetition data, where each time-domain group includes one or more contiguous time-domain units. The transmitting module 902 is configured to transmit scheduling information to a terminal device, where the scheduling information is used to instruct the terminal device to determine a frequency-domain location corresponding to each time-domain group in the one or more time-domain groups.

The apparatus provided in implementations of the present disclosure can group time-domain units, in units of time-domain units, into one or more time-domain groups, where each time-domain group includes one or more time-domain units, and then frequency-domain locations are determined according to the time-domain groups, which can overcome the limitation that frequency-domain locations can only be determined based on a single slot, and can improve granularity of division of frequency-domain locations, thereby improving frequency-domain gain effect.

In some implementations, frequency-domain locations corresponding to at least two time-domain groups in the one or more time-domain groups are not contiguous.

In some implementations, the number of frequency-domain locations determined is greater than 3.

In some implementations, the scheduling information includes at least one of an aggregation factor or information of the frequency-domain locations.

Figure 10:
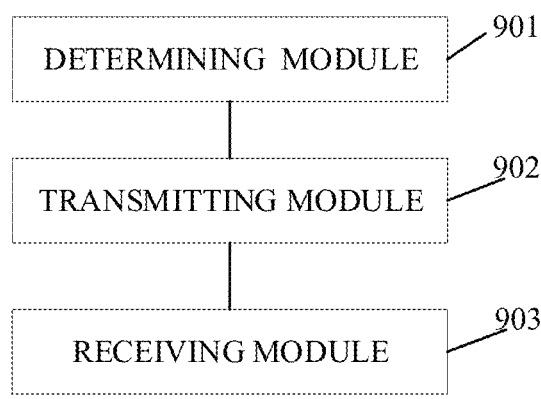
FIG. 10 is a block diagram of an apparatus for determining frequency-domain locations provided in an exemplary implementation of the present disclosure.

In some implementations, referring to FIG. 10, the apparatus further includes a receiving module 903 configured to receive data transmitted by the terminal device according to each time-domain group and the frequency-domain location corresponding to each time-domain group.

In some implementations, each time-domain unit is a symbol, a symbol set, or a slot.

Figure 11:
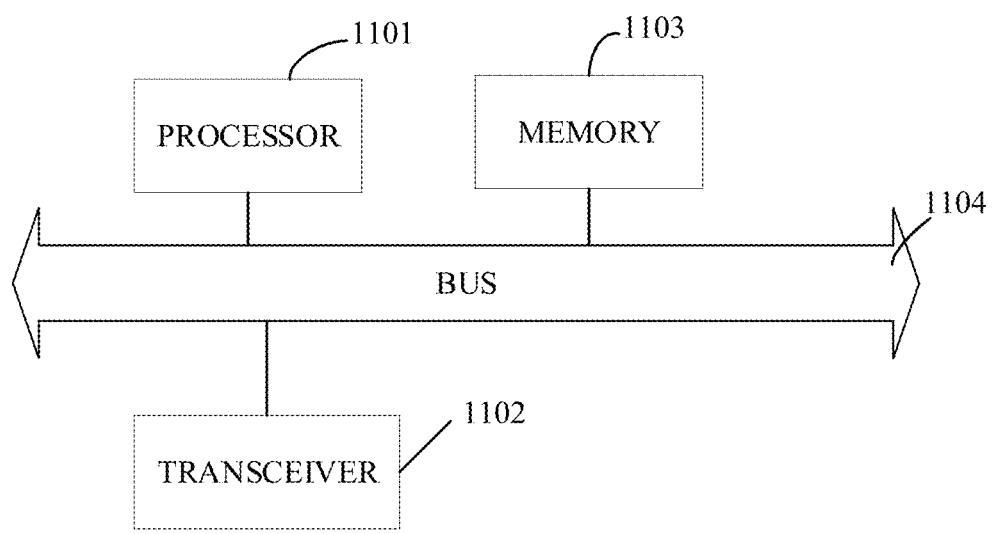
FIG. 11 is a schematic structural diagram of a communication device provided in an exemplary implementation of the present disclosure.

FIG. 11 is a schematic structural diagram illustrating a communication device provided in an exemplary implementation of the present disclosure. The communication device includes a processor 1101, a transceiver 1102, a memory 1103, and a bus 1104.

The processor 1101 includes one or more processing cores. The processor 1101 performs various function applications and information processing by running software programs and modules.

The transceiver 1102 may include a receiver and a transmitter. The transceiver 1102 may be implemented as one communication assembly, where the communication assembly may be a communication chip.

The memory 1103 is coupled to the processor 1101 via the bus 1104.

The memory 1103 can be configured to store at least one program code. The processor 1101 is configured to perform the at least one program code to implement various steps in the above method implementations.

In addition, the communication device may be a terminal device or a network device. The memory 1103 may be realized by any type of volatile or non-volatile storage device or a combination thereof. The volatile or non-volatile storage device includes but is not limited to: a disk or an optical disk, an electrically erasable programmable read-only memory (EEPROM), an erasable programmable read-only memory (EPROM), a static random access memory (SRAM), a read-only memory (ROM), a magnetic memory, a flash memory, a programmable read only memory (PROM).

In exemplary implementations, a computer-readable storage medium is further provided. The computer-readable storage medium stores executable program codes. The executable program codes are loaded and executed by a processor to realize the method for determining frequency-domain locations executed by the communication device in the above method implementations.

Those skilled in the art can understand that all or part of the steps that implement the above implementations can be completed by hardware, or can be completed by instructing relevant hardware through programs. The programs can be stored in a computer-readable storage medium. The above-mentioned storage medium may be an ROM, a disk or an optical disk.

The above is only an optional implementation of the present disclosure, and is not intended to limit the present disclosure. Any modification, equivalent replacement, improvement, etc. made within the spirit and principles of the present disclosure shall be included in the protection scope of the present disclosure.

What is claimed is:

1. A method for determining frequency-domain locations, the method being executed by a terminal device and comprising:
   determining a plurality of time-domain groups for transmitting repetition data, wherein each time-domain group comprises a plurality of contiguous time-domain units, wherein each time-domain unit is a slot; and
   determining a frequency-domain location corresponding to each time-domain group in the plurality of time-domain groups;
   wherein before determining the plurality of time-domain groups for transmitting repetition data, the method further comprises:
      obtaining information of a plurality of frequency-domain locations;
      determining the plurality of time-domain groups for transmitting repetition data comprises:
         determining the plurality of time-domain groups according to the information of the plurality of frequency-domain locations;
      wherein the number of the time-domain units in each time-domain group in the plurality of time-domain groups is determined by an aggregation factor and the number of frequency-hopping locations;
      wherein the number of the time-domain units in each time-domain group is determined according to a ratio of the aggregation factor to the number of the frequency-hopping locations;
      wherein each time-domain group is determined to comprise one time-domain unit on condition that the largest integer not greater than the ratio of the aggregation factor to the number of the frequency-hopping locations is 0; or the largest integer is determined as the number of the time-domain units in each time-domain group on condition that the largest integer not greater than the ratio of the aggregation factor to the number of the frequency-hopping locations is larger than 0.

2. The method of claim 1, wherein the plurality of time-domain groups are determined with the following formula:

$$T_{slot} = \begin{cases} \lfloor T_{Repetition} / N_{FH} \rfloor & \text{if } \lfloor T_{Repetition} / N_{FH} \rfloor > 0 \\ 1 & \text{if } \lfloor T_{Repetition} / N_{FH} \rfloor = 0 \end{cases}$$

$T_{slot}$ represents the number of the time-domain units in each time-domain group, $N_{FH}$ represents the number of the frequency-hopping locations, $T_{Repetition}$ represents the aggregation factor, and $\lfloor T_{Repetition}/N_{FH} \rfloor$ represents the largest integer not greater than the ratio of the aggregation factor to the number of the frequency-hopping locations.

3. The method of claim 1, wherein the frequency-domain location corresponding to each time-domain group in the plurality of time-domain groups is determined by using the following formula:

$$RB^i_{offset} = \begin{cases} FH(i \bmod N_{FH}) & i > 0 \\ 0 & i = 0 \end{cases}$$

$$RB^i = (RB_{start} + RB^i_{offset}) \bmod N^{size}_{BWP}$$

wherein i represents the identifier of a time-domain group, $N_{FH}$ represents the number of frequency-hopping locations, $RB_{start}$ represents a frequency-domain location corresponding to a first time-domain group, i mod $N_{FH}$ represents a remainder of i divided by $N_{FH}$, FH (i mod $N_{FH}$) represents a frequency-hopping formula, $N_{BWP}^{size}$ is the current operating bandwidth, $RB^i_{offset}$ represents a frequency-domain offset corresponding to the i-th time-domain group, $(RB_{start}+RB^i_{offset}) \bmod N_{BWP}^{size}$ represents a remainder of the ratio of the frequency-domain location corresponding to the first time-domain group to the frequency-domain offset corresponding to the i-th time-domain group divided by the current operating bandwidth, and $RB^i$ represents a frequency-domain location corresponding to the i-th time-domain group.

4. A method for determining frequency-domain locations, the method being executed by a network device and comprising:
   determining a plurality of time-domain groups for transmitting repetition data, wherein each time-domain group comprises a plurality of contiguous time-domain units, wherein each time-domain unit is a slot; and
   transmitting scheduling information to a terminal device, the scheduling information being used to instruct the terminal device to determine a frequency-domain location corresponding to each time-domain group in the plurality of time-domain groups;
   wherein before determining the plurality of time-domain groups for transmitting repetition data, the method further comprises:
      obtaining information of a plurality of frequency-domain locations;
      determining the plurality of time-domain groups for transmitting repetition data comprises:
         determining the plurality of time-domain groups according to the information of the plurality of frequency-domain locations;
      wherein the number of the time-domain units in each time-domain group in the plurality of time-domain groups is determined by an aggregation factor and the number of frequency-hopping locations;
      wherein the number of the time-domain units in each time-domain group is determined according to a ratio of the aggregation factor to the number of the frequency-hopping locations;
      wherein each time-domain group is determined to comprise one time-domain unit on condition that the largest integer not greater than the ratio of the aggregation factor to the number of the frequency-hopping locations is 0; or the largest integer is determined as the number of the time-domain units in each time-domain group on condition that the largest integer not greater than the ratio of the aggregation factor to the number of the frequency-hopping locations is larger than 0.

5. A terminal device comprising:
a processor; and
a memory storing a computer program which, when executed by the processor, causes the terminal device to:
  determine a plurality of time-domain groups for transmitting repetition data, wherein each time-domain group comprises a plurality of contiguous time-domain units, wherein each time-domain unit is a slot; and
  determine a frequency-domain location corresponding to each time-domain group in the plurality of time-domain groups;
wherein the computer program is further executed by the processor to cause the terminal device to:
  obtain information of a plurality of frequency-domain locations; and
  determine the plurality of time-domain groups according to the information of the plurality of frequency-domain locations;
wherein the number of the time-domain units in each time-domain group in the plurality of time-domain groups is determined by an aggregation factor and the number of frequency-hopping locations;
wherein the number of the time-domain units in each time-domain group is determined according to a ratio of the aggregation factor to the number of the frequency-hopping locations;
wherein each time-domain group is determined to comprise one time-domain unit on condition that the largest integer not greater than the ratio of the aggregation factor to the number of the frequency-hopping locations is 0; or the largest integer is determined as the number of the time-domain units in each time-domain group on condition that the largest integer not greater than the ratio of the aggregation factor to the number of the frequency-hopping locations is larger than 0.

6. The method of claim 4, wherein the at least one time-domain group is determined with the following formula:

$$T_{slot} = \begin{cases} \lfloor T_{Repetition} / N_{FH} \rfloor & \text{if } \lfloor T_{Repetition} / N_{FH} \rfloor > 0 \\ 1 & \text{if } \lfloor T_{Repetition} / N_{FH} \rfloor = 0 \end{cases}$$

$T_{slot}$ represents the number of the time-domain units in each time-domain group, $N_{FH}$ represents the number of the frequency-hopping locations, $T_{Repetition}$ represents the aggregation factor, and $\lfloor T_{Repetition}/N_{FH} \rfloor$ represents the largest integer not greater than the ratio of the aggregation factor to the number of the frequency-hopping locations.

7. The method of claim 4, wherein the frequency-domain location corresponding to each time-domain group in the plurality of time-domain groups is determined by using the following formula:

$$RB_{offset}^i = \begin{cases} FH(i \bmod N_{FH}) & i > 0 \\ 0 & i = 0 \end{cases}$$

$$RB^i = (RB_{start} + RB_{offset}^i) \bmod N_{BWP}^{size}$$

wherein i represents the identifier of a time-domain group, $N_{FH}$ represents the number of frequency-hopping locations, $RB_{start}$ represents a frequency-domain location corresponding to a first time-domain group, $i \bmod N_{FH}$ represents a remainder of i divided by $N_{FH}$, $FH(i \bmod N_{FH})$ represents a frequency-hopping formula, $N_{BWP}^{size}$ is the current operating bandwidth, $RB_{offset}^i$ represents a frequency-domain offset corresponding to the i-th time-domain group, $(RB_{start}+RB_{offset}^i) \bmod N_{BWP}^{size}$ represents a remainder of the ratio of the frequency-domain location corresponding to the first time-domain group to the frequency-domain offset corresponding to the i-th time-domain group divided by the current operating bandwidth, and $RB^i$ represents a frequency-domain location corresponding to the i-th time-domain group.

8. A network device comprising:
a transceiver;
a processor coupled with the transceiver; and
a memory storing a computer program which, when executed by the processor, to cause the network device to perform the method of claim 4.

* * * * *